United States Patent
Alger et al.

(10) Patent No.: US 6,216,458 B1
(45) Date of Patent: Apr. 17, 2001

(54) EXHAUST GAS RECIRCULATION SYSTEM

(75) Inventors: Matthew J. Alger; Brett M. Bailey; Gerald N. Coleman; Todd A. Davis, all of Peoria; Dennis D. Feucht, Morton; Keith E. Lawrence; Cho Y. Liang, both of Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/328,943

(22) Filed: Jun. 9, 1999

Related U.S. Application Data

(63) Continuation-in-part of application No. 09/059,485, filed on Apr. 13, 1998, now Pat. No. 6,009,709, which is a continuation-in-part of application No. 08/828,685, filed on Mar. 31, 1997, now Pat. No. 5,802,846, and a continuation-in-part of application No. 08/828,240, filed on Mar. 31, 1997, now Pat. No. 6,003,315.

(51) Int. Cl.[7] ................................................. F02M 25/07
(52) U.S. Cl. ..................... 60/605.2; 123/568.12
(58) Field of Search ........................ 60/605.2; 123/568.12

(56) References Cited

U.S. PATENT DOCUMENTS

| | | | |
|---|---|---|---|
| 4,075,994 | * 2/1978 | Mayer et al. .................. 123/568.12 |
| 4,142,493 | 3/1979 | Schira et al. . | |
| 4,161,929 | 7/1979 | Nohira et al. . | |
| 4,164,032 | 8/1979 | Nohira et al. . | |
| 4,164,206 | 8/1979 | Toelle . | |
| 4,173,203 | 11/1979 | Nakajima et al. . | |
| 4,177,777 | 12/1979 | Maruyama et al. . | |
| 4,249,382 | 2/1981 | Evans et al. . | |
| 4,250,706 | 2/1981 | Mitsuda et al. . | |
| 4,267,812 | 5/1981 | Aula et al. . | |
| 4,291,760 | 9/1981 | Argvle et al. . | |
| 4,350,013 | 9/1982 | Yoshiba . | |
| 4,354,476 | 10/1982 | Straubel . | |
| 4,356,806 | 11/1982 | Freesh . | |
| 4,426,848 | 1/1984 | Stachowicz . | |
| 4,445,488 | 5/1984 | Tanaka et al. . | |
| 4,474,008 | 10/1984 | Sakurai et al. . | |
| 4,594,993 | 6/1986 | Engel et al. . | |
| 4,702,218 | 10/1987 | Yoshioka et al. . | |

(List continued on next page.)

FOREIGN PATENT DOCUMENTS

| | | | |
|---|---|---|---|
| 4007516 | * 9/1991 | (DE) | ................................. 60/605.2 |
| 4319380 | 12/1993 | (DE) . | |
| 4240239 | 6/1994 | (DE) . | |
| 4331509 | 7/1994 | (DE) . | |
| 4422966 | 5/1995 | (DE) . | |
| 164-345 | * 1/1989 | (JP) | ................................. 60/605.2 |

*Primary Examiner*—Michael Koczo
(74) *Attorney, Agent, or Firm*—Robert J. Hampsch

(57) ABSTRACT

An exhaust gas recirculation (EGR) system for a turbocharged internal combustion engine is provided. The EGR system includes a recirculation conduit for recirculating a volume of exhaust gas from the exhaust manifold to the intake manifold; a cooling air conduit for transporting a flow of cooling air; and a gas-to-air heat exchanger disposed in operative association with the recirculation conduit and the cooling air conduit and adapted for cooling the volume of recirculated exhaust gas in the recirculation conduit. The cooling air passing through the gas-to air heat exchanger can be diverted from the pressurized intake air, cooled (ATAAC) air, or even fresh ambient air obtained from a source external to said engine and which optionally may be forcibly directed through the heat exchanger via a blower. The disclosed embodiments disclose EGR systems where the exhaust gases are driven from the exhaust manifold to the intake manifold through different techniques including peak clipping EGR systems, venturi based EGR systems, pumped EGR systems or piston pumped EGR systems.

21 Claims, 5 Drawing Sheets

U.S. PATENT DOCUMENTS

| | | |
|---|---|---|
| 4,727,848 | 3/1988 | Stumpp et al. . |
| 4,909,036 | 3/1990 | Kimura . |
| 4,956,973 | 9/1990 | Fortnagel et al. .................. 60/605.2 |
| 5,121,734 | 6/1992 | Grieshaber et al. . |
| 5,142,866 | 9/1992 | Yanagihara et al. ................ 60/605.2 |
| 5,203,311 | 4/1993 | Hitomi et al. . |
| 5,205,265 | 4/1993 | Kashiyama et al. . |
| 5,333,456 | 8/1994 | Bollinger ............................ 60/605.2 |
| 5,425,239 | 6/1995 | Gobert ................................ 60/605.2 |
| 5,440,880 | 8/1995 | Ceynow et al. .................... 60/605.2 |
| 5,564,275 | 10/1996 | Codan et al. ....................... 60/605.2 |
| 5,607,010 | 3/1997 | Schonfeld et al. . |
| 5,611,203 | 3/1997 | Henderson et al. ................ 60/605.2 |
| 5,611,204 | 3/1997 | Radovanovic et al. ............. 60/605.2 |
| 5,617,726 | 4/1997 | Sheridan et al. .................... 60/605.2 |
| 5,657,630 | 8/1997 | Kjemtrup et al. ................... 60/605.2 |
| 5,671,600 | 9/1997 | Pischinger et al. ................. 60/605.2 |
| 5,682,746 | 11/1997 | von Hoerner ....................... 60/605.2 |
| 5,711,154 | 1/1998 | Baechle et al. ..................... 60/605.2 |
| 5,778,674 * | 7/1998 | Kimura ............................... 60/605.2 |
| 5,802,846 * | 9/1998 | Bailey ................................. 60/605.2 |
| 6,003,315 * | 12/1999 | Bailey ................................. 60/605.2 |
| 6,009,709 * | 1/2000 | Bailey ................................. 60/605.2 |
| 6,038,860 * | 3/2000 | Bailey ................................. 60/605.2 |

\* cited by examiner

EXHAUST GAS RECIRCULATION SYSTEM

This application is a continuation in part of application Ser. No. 09/059,485, filed on Apr. 13, 1998, U.S. Pat. No. 6,009,709, which is a continuation in part of application Ser. No. 08/828,685, filed on Mar. 31, 1997 now issued as U.S. Pat. No. 5,802,846. In addition, this application is also a continuation in part of application Ser. No. 08/828,240, filed on Mar. 31, 1997, U.S. Pat. No. 6,003,315. The disclosures of all aforementioned patent applications are incorporated herein by reference.

FIELD OF THE INVENTION

The present invention relates to an exhaust gas recirculation (EGR) system for an internal combustion engine, and more particularly, to an exhaust gas recirculation counter flow air-to-air heat exchanger for use in a turbo-charged diesel engine that is adapted for cooling the EGR flow.

BACKGROUND

Exhaust gas recirculation is a technique commonly used for controlling the generation of undesirable pollutant gases and particulate matter in the operation of internal combustion engines. This technique has proven particularly useful in internal combustion engines used in motor vehicles such as passenger cars, light duty trucks, and other on-road motor equipment. The exhaust gas recirculation technique primarily involves the recirculation of exhaust gas by-products into the intake air supply of the internal combustion engine. This exhaust gas thus reintroduced to the engine cylinder reduces the concentration of oxygen therein, which in turn lowers the maximum combustion temperature within the cylinder and slows the chemical reaction of the combustion process, decreasing the formation of nitrous oxide. Furthermore, the exhaust gases typically contain a portion of unburned hydrocarbon which is burned on its reintroduction into the engine cylinder, which further reduces the emission of exhaust gas by-products which would be emitted as undesirable pollutants from the internal combustion engine.

When utilizing EGR in a turbocharged diesel engine, the exhaust gas to be recirculated is preferably removed upstream of the exhaust gas driven turbine associated with the turbocharger. In many EGR applications, the exhaust gas is diverted directly from the exhaust manifold. Likewise, the recirculated exhaust gas is preferably re-introduced to the intake air stream downstream of the compressor and air-to-air aftercooler. For example, in many EGR applications the recirculated exhaust gas is reintroduced to the intake manifold.

Reintroducing the exhaust gas downstream of the compressor and air-to-air aftercooler is preferred due to the reliability and maintainability concerns that arise should the exhaust gas is passed through the compressor and aftercooler. However at some engine operating conditions, there is a pressure differential between the intake manifold and the exhaust manifold which essentially prevents many conventional EGR systems from being utilized. For example, at high speed, high load conditions in a turbocharged engine, the exhaust gas does not readily flow from the exhaust manifold to the intake manifold.

It is well known that lower intake manifold temperatures tends to reduce the formation of nitrous oxides found in the exhaust gases. Therefore cooling of the EGR is a technique that has been used to further augment the reduction of NOx where EGR is employed. Various EGR cooling subsystems have been disclosed in the related art including jacket water cooled EGR cooling systems and EGR systems diverting the recirculated exhaust gases through the engine intake intercooler or aftercooler.

Using a jacket water EGR cooler is the most common technique disclosed in the related art. However, one of the key challenges of cooling EGR by means of a jacket water cooler is the increase in heat rejection from the jacket water EGR cooler. The significant heat rejection to the jacket water cooling system due to the presence of a cooled EGR system requires sizable increases in the vehicle radiator. The other technique of utilizing the intercooler or aftercooler of the intake system presents problems from a fouling of various components on the intake system from the dirty exhaust gases recirculating therethrough.

Several other related art EGR cooling systems have been disclosed including U.S. Pat. No. 5,607,010 (Schonfeld). U.S. Pat. No. 5,607,010 (Schonfeld) discloses an EGR system that includes an EGR conduit or pipe and a pair of heat exchangers connected in series in the EGR pipe and each adapted to cool the exhaust gases to different predetermined temperature ranges wherein the exhaust gas is cooled to a temperature of about 250 degrees C.

What is needed, therefore, is a simple and inexpensive technique for recirculating exhaust gas from the exhaust manifold to the intake manifold at all engine operating conditions while efficiently cooling the recirculated exhaust gases to the desired temperature without fouling of the intake air system.

SUMMARY OF THE INVENTION

The present invention addresses the above and other needs by providing a system for exhaust gas recirculation in an internal combustion engine, preferably a turbocharged diesel engine, that utilizes an air to air heat exchanger or other primary surface heat exchanger to cool the recirculating exhaust gases. The air to air heat exchanger uses a source of cooling air to cool the recirculating exhaust gases in an EGR conduit.

The invention may also be characterized as a method of recirculating exhaust gas in an engine comprising the steps of: (a) recirculating a volume of exhaust gas to from the exhaust manifold to the intake manifold via a recirculation conduit and an gas-to-air heat exchanger; (b) directing a flow of cooling air through an air cooling conduit and the heat exchanger; and (c) cooling the recirculated exhaust gas in the gas-to-air heat exchanger with the flow of cooling air.

Additional features of the disclosed invention include an exhaust gas recirculation system wherein the cooling air is pressurized air diverted from the intake air system at a location downstream of the turbocharger or other intake air pressurizing device. Alternatively, the present invention may be configured such that the cooling air is fresh air that may be forcibly transported through the air to air heat exchanger with the aid of a blower or similar such device. Still further, the cooling fresh air that is impinging on the engine (i.e. ram air), for example as a truck engine or other vehicle travels.

Yet another aspect of the present invention relates to the disposal of the heated cooling air subsequent to cooling the recirculated exhaust gas. In one embodiment of the invention the heated cooling air is diverted to the engine exhaust system circuit such that the heated air can be disposed of in a safe manner. Alternatively, the heated cooling air may be diverted to the turbocharger to help drive the exhaust gas driven turbine along with the remaining exhaust gases that are not being recirculated.

Still another desirable aspect of the present invention is the provision of a fresh air bypass conduit for controllably diverting a portion of the cooling air so as to bypass the air-to-air heat exchanger or otherwise preventing cooling air from entering the air to air heat exchanger. By operatively controlling the flow of cooling air through the air to air heat exchanger (or controlling the flow of cooling water in a jacket water EGR cooler) in response to the engine operating conditions, the EGR system can be optimized the yield the best balance of engine emissions and engine performance.

BRIEF DESCRIPTION OF THE DRAWINGS

The above and other aspects, features, and advantages of the present invention will be more apparent from the following, more descriptive description thereof, presented in conjunction with the following drawings, wherein.

Corresponding reference numbers indicate corresponding components throughout the several embodiments depicted in the drawings.

DETAILED DESCRIPTION OF THE INVENTION

The following descriptions are of the best modes presently contemplated for carrying out the invention. This description is not to be taken in a limiting sense, but is made merely for the purpose of describing the general principals of the invention. The scope and breadth of the invention should be determined with reference to the claims.

Figure 1:
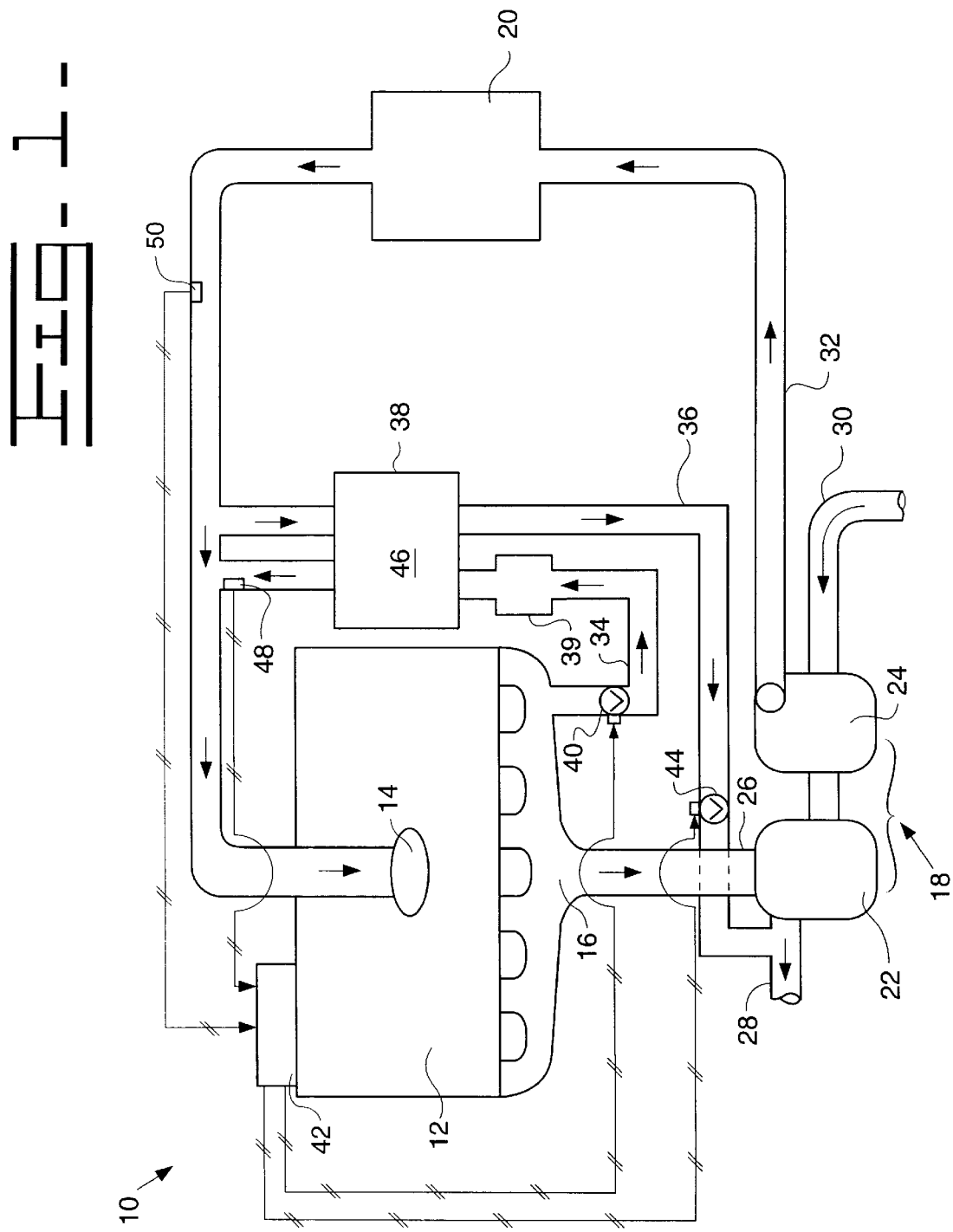
FIG. 1 is a schematic representation of the exhaust gas recirculation (EGR) system for a turbocharged engine in accordance with the present invention.

Turning now to the drawings and particularly to FIG. 1 there is shown a schematic representation of the exhaust gas recirculation (EGR) system 10 for a turbocharged compression ignition engine 12 (i.e. diesel engine). As seen therein, the turbocharged compression ignition engine 12 includes an intake manifold 14, exhaust manifold 16, a turbocharger 18, and an air-to-air aftercooler 20. The turbocharger 18 may be a fixed geometry turbocharger or a variable geometry turbocharger (VGT) having an exhaust gas driven turbine 22 coupled to an intake air compressor 24. The turbocharger 18 also includes an exhaust gas inlet 26 and an exhaust gas outlet 28 both in fluid communication with the exhaust gas driven turbine 22. The turbocharger 18 further includes a fresh intake air conduit 30 and a compressed air exit conduit 32 both of which are in fluid communication with the air compressor 24.

In this preferred embodiment, the EGR system 10 includes an EGR conduit 34, cooling air conduit 36, an EGR cooler or gas to air heat exchanger 46, and an optional particulate trap 39. As seen in FIG. 1, the EGR conduit 34 is disposed in fluid communication with the exhaust manifold 16 and is adapted for diverting a flow of exhaust gas from the exhaust manifold 16 to a position downstream of the compressor 24 and air-to-air aftercooler 20 and proximate the intake manifold 14. The diverted flow of exhaust gas from the exhaust manifold 16 via the EGR conduit 34 is controlled using one or more EGR valves 40 operatively associated with an engine controller 42 or similar such engine control module (ECM).

The illustrated EGR system 10 also includes the cooling air conduit 36 for transporting or diverting a flow of cooled, compressed intake air from a position downstream of the compressor 24 and air-to-air aftercooler 20 to the exhaust manifold 16. The flow of cooled, compressed intake air within the cooling air conduit 42 is likewise controlled using a bleed air valve 44 or other cooling air valve 44 operating under the control of the engine controller 42.

In the illustrated embodiment, the EGR cooler is a counterflow air to EGR heat exchanger 46. The illustrated EGR heat exchanger 46 is adapted to receive a hot EGR input flow from the exhaust manifold 16 via the EGR conduit 34 and yield a cooled EGR output flow. The counterflow of the EGR heat exchanger 46 is adapted to receive the diverted intake air (i.e. bleed air) or other source of cooling air via cooling air conduit 36. The cooling air is then heated by the hot EGR to produce heated cooling air while simultaneously cooling the EGR flow through the EGR heat exchanger 46. The heated cooling air exiting from the EGR heat exchanger 46 is combined with the exhaust gas. As indicated above, the use of a source of cooling air such as intake air to cool the recirculated exhaust gas eliminates the need to use the engine jacket water coolant to absorb the heat from the recirculating exhaust gases and avoids additional heat rejection and additional pumping losses associated therewith.

Additional features of the illustrated embodiment of the EGR system include an optional exhaust particulate trap 39, a temperature sensor 48, and a mass flow sensor 50. The particulate trap 39, if used, is preferably disposed along the EGR conduit 34 upstream of the EGR heat exchanger 46. Temperature sensor 48 is preferably disposed along the EGR conduit 34 proximate the intake manifold and is adapted to measure the temperature of the cooled EGR flow. Mass flow sensor 50 is located within the intake air flow circuit, preferably downstream of the turbocharger 22 and aftercooler 20 yet upstream of the location of the EGR conduit 34. The mass flow sensor is adapted to measure the non-EGR air intake to the engine. Both the temperature sensor 48 and mass flow sensor 50 are operatively connected to the engine controller 42 where such measurements are utilized to control the operation of the engine, including the EGR system 10 by controlling the bleed air valve or cooling air valve 44 as well as the primary EGR valves 40.

In the embodiment illustrated in FIG. 1, the diverted exhaust gas is driven to the intake manifold 14 by the positive displacement pumping action of one or more designated cylinders. The complete diversion of exhaust gas from one or more cylinders (e.g. cylinder number 6) to the EGR conduit 34 allows the EGR rate to be kept more or less constant without having to throttle the EGR valves 40, although modulation of the EGR rate is possible, and in some cases desirable. In addition, since the exhaust gas diverted from the selected cylinders is typically pressurized above that of the exhaust manifold 16 and intake manifold 14, the EGR system 10 is adapted to operate within a broader range of engine operating conditions (i.e. at high load conditions). As indicated above, there exist some engine operating conditions, such as high load conditions, where the pressure differential between the intake manifold and the exhaust manifold essentially prevents many conventional EGR systems from being utilized without expensive and inefficient throttling arrangements in either the exhaust or intake manifolds. Although shown using a piston pumped EGR drive means, it is fully contemplated that one could substitute a venturi based EGR system, a simple blower or pump driven EGR system or even a peak clipping EGR system while still incorporating the present invention.

Figure 2:
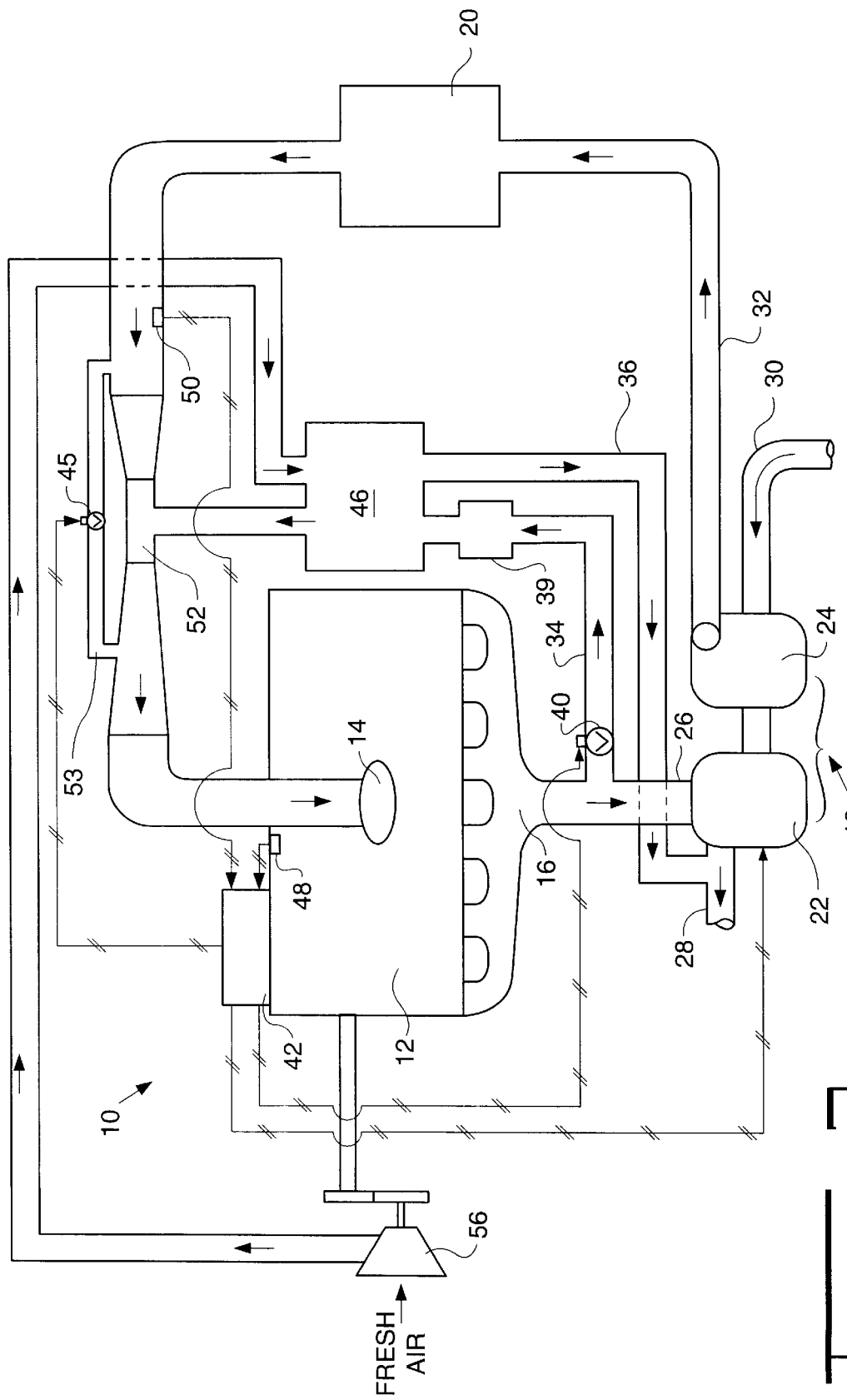
FIG. 2 is a schematic representation of an alternate embodiment of the exhaust gas recirculation (EGR) system for a turbocharged engine in accordance with the present invention.

Turning now to FIG. 2, there is shown an alternate embodiment of the EGR system 10. In many respects, the EGR system 10 of FIG. 2 is similar to that disclosed above, with reference to FIG. 1, except for the technique and associated structure for driving the diverted exhaust gas from the exhaust manifold 16 to the intake circuit, the source of cooling air, and the EGR cooling system arrangements.

In the embodiment illustrated in FIG. 2, the intake air circuit includes a venturi element 52 disposed downstream of the air-to-air aftercooler 20 and turbocharger 18 and upstream of the intake manifold 14. The EGR conduit 34 diverts the exhaust gas from the exhaust manifold 16 to a location proximate the throat of the venturi element 52 thereby allowing the lower pressure exhaust gas from the exhaust manifold 16 to be drawn into the intake circuit and fed into the engine 12 with the intake air. Again, since the exhaust gas diverted from the exhaust manifold 16 is typically pressurized below that of the intake manifold 14 in many engine operating conditions, the venturi element 52 is adapted to compensate for the pressure differences and allow the EGR system 10 to operate within the a broader range of engine operating conditions (i.e. at high load conditions).

A venturi bypass conduit 53 is also disposed within the intake circuit so as to allow intake air to circumvent the venturi element 52. A proportional valve 45 is preferably disposed along the venturi bypass conduit 53. The proportional valve 45 is operatively connected to the engine controller 42 and controls the flow of intake air passing through the venturi element 52 which in effect controls the pressure at the throat of the venturi element 52 and thus the flow of exhaust gas to the intake circuit.

In the embodiment illustrated in FIG. 2, the cooling air is obtained from a source of fresh air, external to the engine 12. In the illustrated embodiment, the fresh air is forcibly transported through the cooling conduit 36 and the air to air heat exchanger 46 with the aid of a blower 56. The blower 56 may be driven from an auxiliary wheel disposed on the compressor 24 of the turbocharger 18 or may be belt driven of gear driven from the engine drive systems, as shown in FIG. 2. Although not shown, the ambient cooling air is ducted to the blower or other air-forcing device from the air cleaner on the vehicle to maintain cooler cleanliness. As with the earlier described embodiment, the heated cooling air is disposed of by diverting it to a prescribed location in the exhaust system.

Varying the blower speed with a variable drive from the engine crankshaft could control the cooling flow. By operatively controlling the flow of cooling media through the heat exchanger 46 in response to the engine operating conditions, the EGR cooling rate is regulated to minimize any fuel consumption penalty associated with the EGR system 10 and otherwise achieve the best balance of engine emissions and engine performance.

As with the previously described embodiment, the embodiment of FIG. 2 includes a temperature sensor 48, a mass flow sensor 50, as well as conventional engine speed and load indicators (not shown). The temperature sensor 48 is preferably disposed along the EGR conduit 34 proximate the intake manifold and is adapted to measure the temperature of the cooled EGR flow. Mass flow sensor 50 is preferably disposed within the intake air flow circuit. Both the temperature sensor 48 and mass flow sensor 50 are operatively connected to the engine controller 42 where such measurements are utilized in conjunction with engine speed and load indications to control the operation of the EGR system 10 by controlling the proportional venturi bypass valve 45, variable geometry turbocharger 22 as well as the optional on-off EGR valve 40 disposed within the EGR conduit 34.

Although shown in FIG. 2 using a venturi based EGR system, it is fully contemplated that one could substitute a piston pumped EGR system, a simple blower or pump driven EGR system or even a peak clipping EGR system while still incorporating the beneficial aspects of the fresh air cooling system disclosed in the embodiment of FIG. 2.

Figure 3:
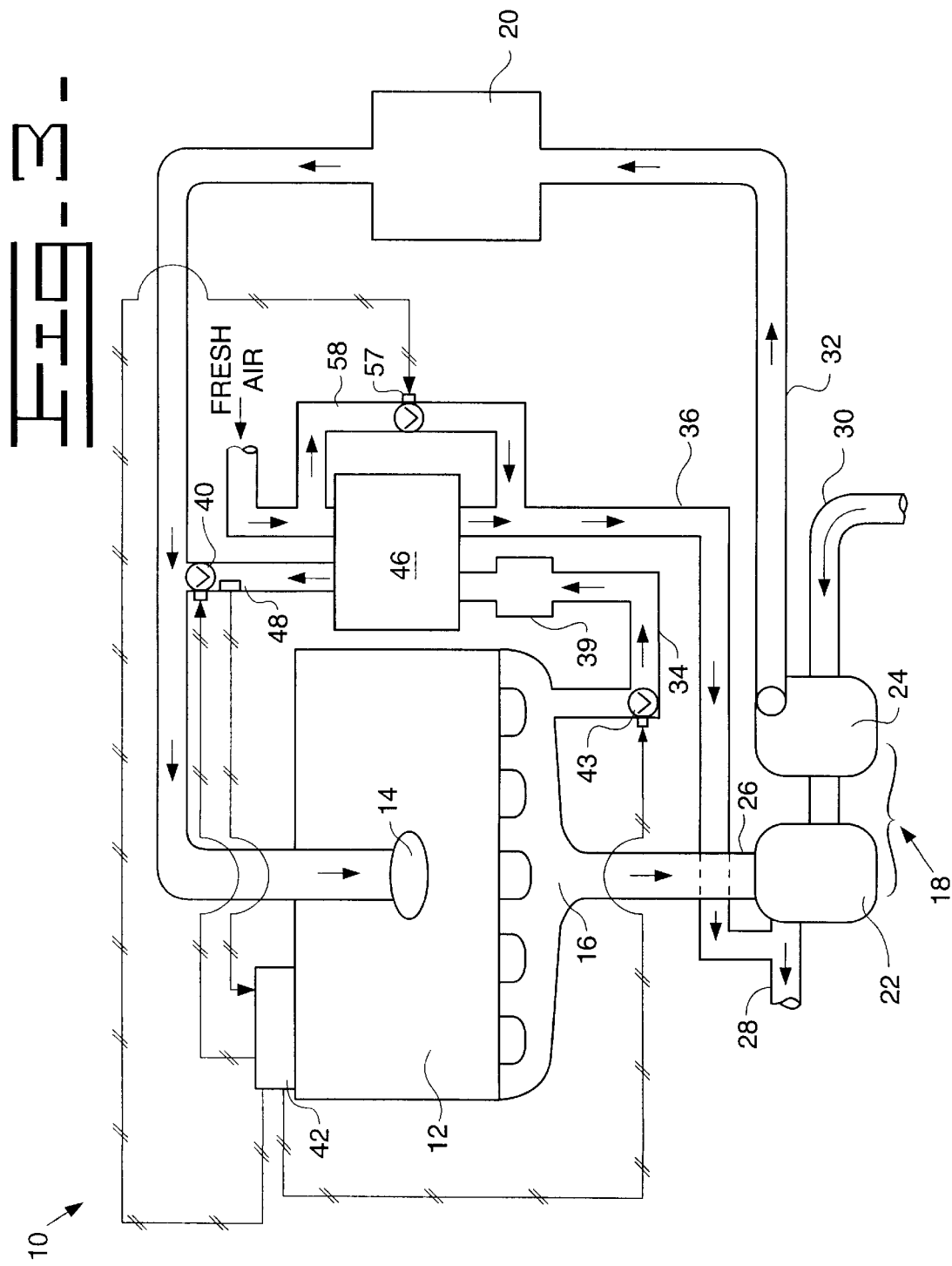
FIG. 3 is a schematic representation of yet another embodiment of the exhaust gas recirculation (EGR) system for a turbocharged engine in accordance with the present invention.
Figure 4:
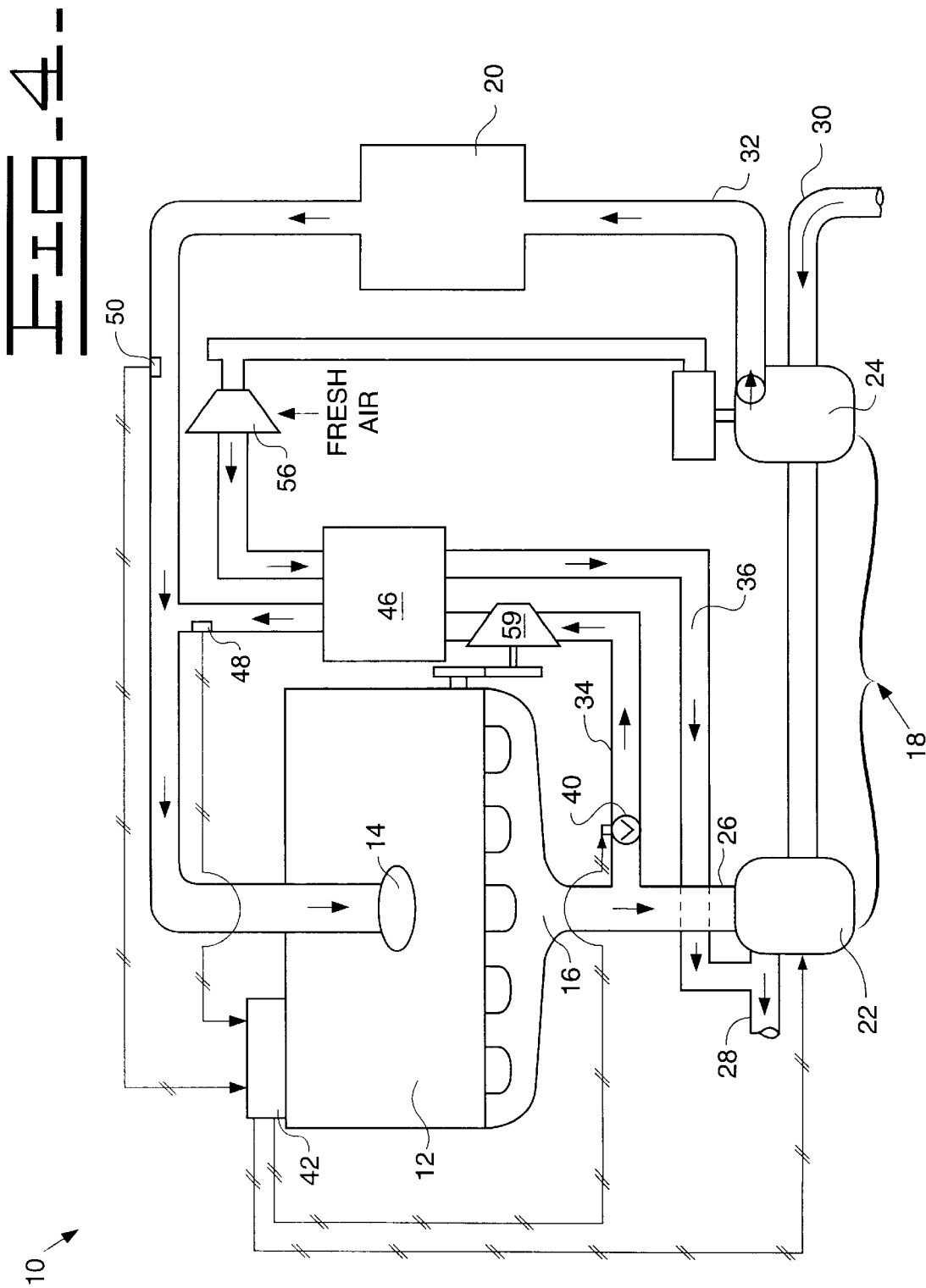
FIG. 4 is a schematic representation of a fourth embodiment of the exhaust gas recirculation (EGR) system for a turbocharged engine in accordance with the present invention.
Figure 5:
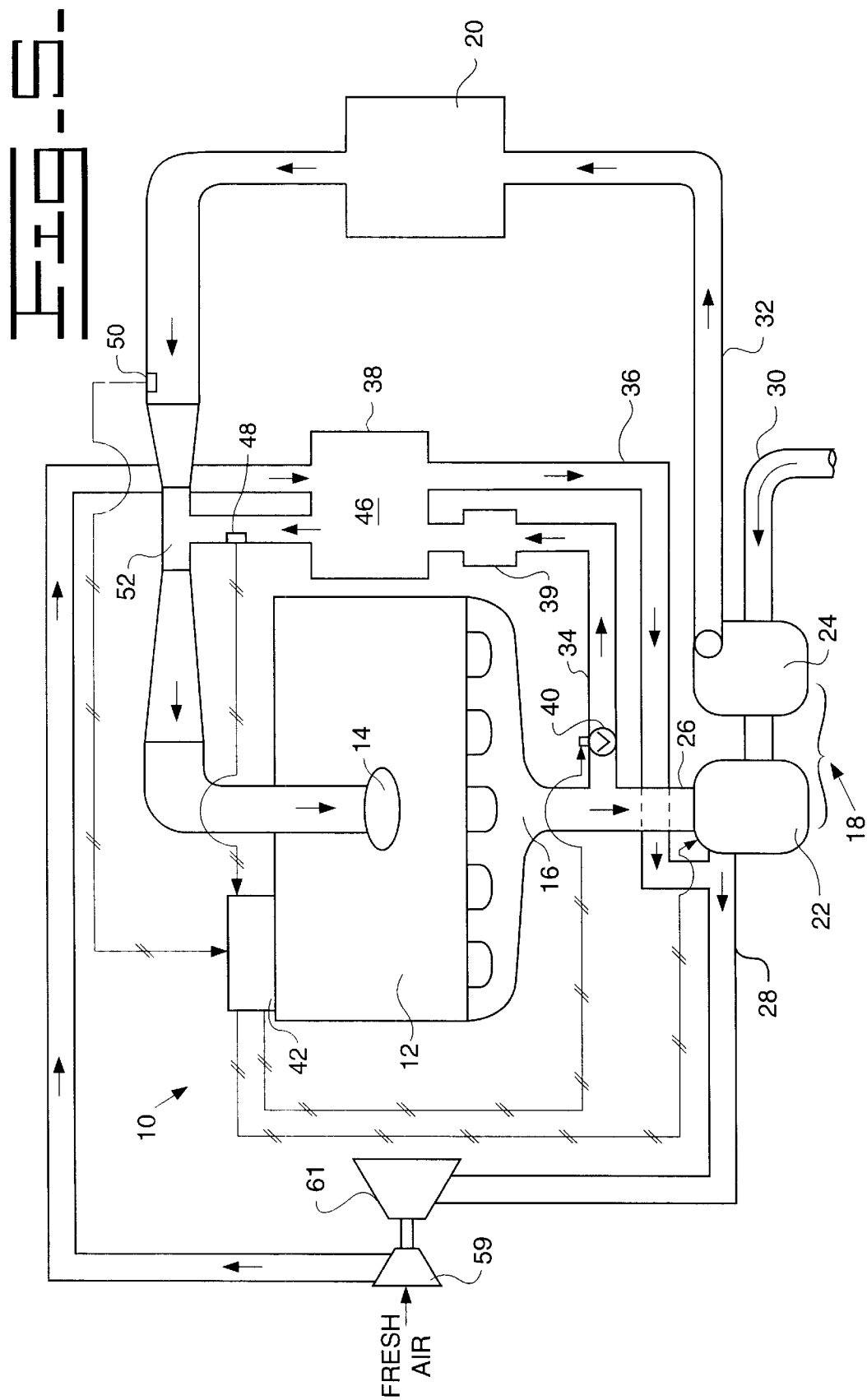
FIG. 5 is a schematic representation of still another embodiment of the exhaust gas recirculation (EGR) system for a turbocharged engine in accordance with the present invention.

Turning now to FIG. 3, there is shown yet another embodiment of the EGR system 10. In many respects, the EGR system 10 of FIG. 3 is similar to the embodiments disclosed above except that for the exhaust gas is recirculated from the exhaust manifold 16 to the intake manifold 14 only during selected peak pressures within the exhaust manifold 16. This peak-clipping EGR system also includes an EGR valve 43, either operatively controlled by the ECM as illustrated or alternatively operating as a check valve and the primary EGR valve 40 disposed in the exhaust gas recirculation conduit 34. The EGR valves are operatively controlled by the engine controller 42 so as to regulate the flow of exhaust gases through the EGR system 10. The EGR check valve 43 is responsive to the instantaneous pressure fluctuations in the exhaust manifold 16 such that recirculated exhaust gas flows from said exhaust manifold 16 to said intake manifold 14 occurs when the peak pressures within the exhaust manifold 16 exceeds the intake manifold pressures.

In the embodiment illustrated in FIG. 3, the cooling air is likewise obtained from a source of fresh air, external to the engine 12. In the illustrated embodiment, however, the cooling air transported through the gas to air heat exchanger 46 is fresh air that is impinging on the engine 12 (i.e. ram air) or fresh air otherwise drawn through the radiator with a fan as the vehicle in which the engine 12 is placed travels at a given speed. As with the earlier described embodiments, the heated cooling air is disposed of by diverting the heated cooling air to a prescribed location in the exhaust system.

The EGR system 10 may also include a fresh air bypass conduit 58 or other cooling media bypass conduit 58 circumventing the heat exchanger 46. A cooling bypass valve 57 is preferably disposed in conjunction therewith for controllably diverting some or all of the cooling media (i.e. cooling air) so as to bypass the heat exchanger 46. Although not shown, the cooling bypass valve 57 may alternatively be arranged so as to merely prevent cooling air from entering the air to air heat exchanger 46. By operatively controlling the flow of cooling media through the heat exchanger 46 in response to the engine operating conditions, the EGR cooling rate is regulated to minimize any fuel consumption penalty associated with the EGR system 10 and otherwise achieve the best balance of engine emissions and engine performance. Such an arrangement would allow for the selection of either hot EGR or cooled EGR as well as controlling the amount of EGR cooling that is occurring. Hot EGR is more effective at light load conditions of the engine whereas cooled EGR is often required at higher load conditions in order to meet the emission regulations.

As with the previously described embodiments, the embodiment of FIG. 3 also includes various sensors including one or more pressure sensors 49, temperature sensors 48, and mass flow sensors 50, as well as conventional engine speed and load indicators which feed into the engine controller 42. The engine controller 42 in turn controls the EGR system 10 through operatively regulating the EGR valves, cooling bypass valve 57, etc.

The fourth embodiment is an EGR system 10, much like the previously disclosed embodiments but uses a blower, pump, supercharger, or other positive force device 59 to drive the recirculated exhaust gas from the exhaust manifold 16 to the intake circuit. The cooling air is obtained from a source of fresh air that is likewise forcibly transported through the cooling air conduit 36 and gas to air heat exchanger 46. Preferably, the pumped fresh air or cooling air is driven from a secondary compressor wheel on the turbocharger 18. Although not shown, the primary EGR blower 59 or pump could also utilize the turbocharger as its drive force in a similar manner. The primary EGR blower 59 or pump is shown as being driven directly from the engine 12 and thus operates relative to engine speed.

The final disclosed embodiment of the EGR system 10, much like the previously disclosed embodiments, uses a venturi system to drive the recirculated exhaust gas from the exhaust manifold 16 through the gas to air heat exchanger to the intake circuit. The cooling air is obtained from a source of fresh ambient air that is likewise forcibly transported through the cooling air conduit 36 and gas to air heat exchanger 46. Preferably, the pumped fresh air is driven using a blower 59 driven from a second exhaust gas driven turbine 61 in series with the primary turbocharger 18. The heated cooling air is subsequently disposed of in a manner similar to the above described embodiments. This embodiment has the additional advantage in that using a turbine to drive the cooling air blower causes the exhaust back pressure to raise and help drive the recirculated exhaust gases from the exhaust manifold to the intake manifold.

Having described five separate embodiments, one skilled in the art can appreciate that the various features disclosed in one or more of the embodiments might be used in other embodiments and other EGR systems. For example, the use of a cooling media bypass conduit or an intake air bypass conduit; the use of forced fresh air as cooling air, ram air as cooling air, or bleed air as cooling air; the use of proportional EGR valves or on/off EGR valves, as well as the use of various pressure sensors, temperature sensors, mass air flow sensors, and other notable features could all be incorporated into one or more of the EGR systems, including the piston-pumped (cylinder diverted) EGR system, the peak-clipping EGR system, the venturi based EGR system, and the pumped or forced EGR system.

Turning again to the various embodiments illustrated in the FIGS., one skilled in the art can appreciate and understand the methods of recirculating exhaust gas associated with the illustrated embodiments. Broadly speaking, the disclosed method of recirculating exhaust gas comprises the steps of: recirculating a selected volume of exhaust gas from the exhaust manifold to the intake circuit via the EGR conduit; transporting a flow of cooling air through a separate cooling conduit; and cooling the recirculated exhaust gas in the EGR conduit using the flow of cooling air and an air to air heat exchanger or other primary surface heat exchanger. The method also includes the step of concurrently heating the cooling air in the cooling conduit using the recirculated exhaust gas. The heated cooling air is fed to the exhaust manifold where it is used to replace the recirculated exhaust gas. Alternatively, the heated cooling air is sent directly to the exhaust system for appropriate disposal.

From the foregoing, it should be appreciated that the present invention provides for the recirculation of exhaust gas in a turbocharged diesel engine. While the invention herein disclosed has been described by means of specific embodiments and methods associated therewith, modifications and variations can be made thereto by those skilled in the art without departing from the scope of the invention as set forth in the claims or sacrificing all its material advantages.

What is claimed is:

1. An exhaust gas recirculation system for a compression ignition engine having an intake circuit, an intake manifold, an exhaust circuit and an exhaust manifold, said intake circuit including an intake air pressurizing device, said exhaust gas recirculation system comprising:
   an exhaust gas recirculation conduit for diverting a flow of recirculated exhaust gas to said intake circuit;
   a cooling air conduit for transporting a flow of cooling air used to cool said recirculated exhaust gas, said cooling air conduit is in fluid communication with said exhaust circuit; and
   an air to EGR heat exchanger disposed in operative association with said exhaust gas recirculation conduit and said cooling air conduit and adapted for cooling said exhaust gas in said exhaust gas recirculation conduit.

2. The exhaust gas recirculation system of claim 1 wherein said cooling air is pressurized intake air diverted from the intake circuit downstream of said intake air pressurizing device.

3. The exhaust gas recirculation system of claim 1 wherein said intake circuit includes an air-to-air after-cooler and said cooling air is cooled intake air diverted from the intake circuit downstream of said air-to-air after-cooler.

4. The exhaust gas recirculation system of claim 1 further comprising a blower adapted for forcibly transporting said air through said cooling air conduit.

5. The exhaust gas recirculation system of claim 1 wherein said exhaust gas recirculation conduit is disposed in fluid communication with one or more cylinders for driving a flow of exhaust gas from said cylinders to said intake manifold using the pumping action of said cylinders.

6. The exhaust gas recirculation system of claim 1 wherein said intake circuit further includes a venturi element disposed downstream of said air intake pressurizing device, and wherein said exhaust gas recirculation conduit is disposed in fluid communication with said venturi element for driving a flow of exhaust gas to said intake manifold via said venturi element.

7. The exhaust gas recirculation system of claim 1 further comprising a blower operatively disposed in said exhaust gas recirculation conduit for driving a flow of exhaust gas from said exhaust manifold to said intake manifold.

8. The exhaust gas recirculation system of claim 1 further including an exhaust gas recirculation valve disposed in said exhaust gas recirculation conduit and responsive to pressure changes in said exhaust manifold such that a flow of recirculated exhaust gas from said exhaust manifold to said intake manifold occurs at selected peak pressures within said exhaust manifold.

9. The exhaust gas recirculation system of claim 1 further including one or more flow control devices for controlling the flow of recirculated exhaust gas in said exhaust gas recirculation conduit and the flow of cooling air in said cooling air conduit.

10. The exhaust gas recirculation system of claim 9 further comprising a cooling air bypass conduit for controllably diverting a portion of said cooling air from said air to EGR heat exchanger.

11. The exhaust gas recirculation system of claim 9 further including a sensor disposed proximate to the intake manifold and adapted for measuring intake manifold conditions and controlling said flow control devices in response thereto.

12. The exhaust gas recirculation system of claim 11 wherein said sensor is a temperature sensor adapted to ascertain the temperature proximate the intake manifold and controlling said flow control devices in response thereto.

13. The exhaust gas recirculation system of claim 11 wherein said sensor is a pressure sensor adapted to ascertain the pressure proximate the intake manifold and controlling said flow control devices in response thereto.

14. The exhaust gas recirculation system of claim 9 further including a mass flow sensor disposed along said intake circuit and adapted for measuring the mass flow rate of said intake air and controlling said flow control devices in response thereto.

15. A method of recirculating exhaust gas in an internal combustion engine, said engine having an intake circuit including an intake air pressurizing device, an intake manifold, and an exhaust circuit including an exhaust manifold, the method comprising the steps of:

recirculating a volume of exhaust gas to said intake manifold via a recirculation conduit and an air to EGR heat exchanger;

directing a flow of cooling air through a cooling air conduit and said air to EGR heat exchanger to said exhaust circuit; and cooling said recirculated exhaust gas in said air to EGR heat exchanger using said flow of cooling air.

16. The method of recirculating exhaust gas of claim 15 wherein said cooling air is pressurized intake air diverted from said intake circuit downstream of said intake air pressurizing device.

17. The method of recirculating exhaust gas of claim 15 wherein the step of directing said flow of cooling air further comprises forcibly directing said flow of cooling air through said cooling air conduit and said air to EGR heat exchanger with the aid of a blower.

18. The method of recirculating exhaust gas of claim 15 wherein the step of recirculating a volume of exhaust gas to said intake manifold further comprises the step of driving a flow of exhaust gas from one or more cylinders directly to said intake manifold via said recirculation conduit using the pumping action of said cylinders.

19. The method of recirculating exhaust gas of claim 15 wherein said intake circuit further includes a venturi element disposed downstream of said air intake pressurizing device, and the step of recirculating a volume of exhaust gas to said intake manifold further comprises driving a flow of exhaust gas to said venturi element via said pressure differential between said venturi element and said exhaust manifold created by said venturi effect.

20. The method of recirculating exhaust gas of claim 15 wherein said engine further includes an exhaust gas recirculation valve disposed in said exhaust gas recirculation conduit responsive to the pressure changes in said exhaust manifold such that a flow of recirculated exhaust gas from said exhaust manifold to said intake manifold occurs at selected peak pressures within said exhaust manifold.

21. The method of recirculating exhaust gas of claim 15 wherein the step of recirculating a volume of exhaust gas further comprises the step of driving a flow of exhaust gas from said exhaust manifold to said intake manifold with a blower operatively disposed in said exhaust gas recirculation conduit.

* * * * *